United States Patent
Lowery

(10) Patent No.: US 7,686,280 B2
(45) Date of Patent: Mar. 30, 2010

(54) REMOVABLE VALVE SEAT MEMBER FOR DIAPHRAGM VALVE

(75) Inventor: Patrick A. Lowery, Greer, SC (US)

(73) Assignee: Circor Instrumentation Technologies, Inc., Spartanburg, SC (US)

( * ) Notice: Subject to any disclaimer, the term of this patent is extended or adjusted under 35 U.S.C. 154(b) by 449 days.

(21) Appl. No.: 11/319,336

(22) Filed: Dec. 28, 2005

(65) Prior Publication Data

US 2007/0145321 A1   Jun. 28, 2007

(51) Int. Cl.
    *F16K 1/42* (2006.01)
(52) U.S. Cl. .............. 251/362; 251/331; 251/335.2; 251/361; 251/363
(58) Field of Classification Search ............ 251/331, 251/335.2, 360–363, 368, 333; 137/315.02, 137/327
See application file for complete search history.

(56) References Cited

U.S. PATENT DOCUMENTS

| | | | | |
|---|---|---|---|---|
| 1,364,848 A | * | 1/1921 | Walsh | 251/362 |
| 2,192,339 A | * | 3/1940 | Wilson | 251/334 |
| 2,301,355 A | * | 11/1942 | Armentrout | 138/45 |
| 3,044,743 A | * | 7/1962 | Siegel | 251/332 |
| 3,572,633 A | * | 3/1971 | Gaffney | 251/356 |
| 3,844,532 A | * | 10/1974 | Buck | 251/360 |
| 4,337,788 A | * | 7/1982 | Seger | 137/315.02 |
| 4,421,295 A | | 12/1983 | Parkison | |
| 4,520,842 A | * | 6/1985 | Elliott | 137/327 |
| 4,540,400 A | | 9/1985 | Hooven | |
| 4,667,931 A | | 5/1987 | Egert et al. | |
| 4,671,490 A | | 6/1987 | Kolenc et al. | |
| 4,715,578 A | | 12/1987 | Seltzer | |
| 5,131,627 A | | 7/1992 | Kolenc | |
| 5,215,286 A | * | 6/1993 | Kolenc | 251/58 |
| 5,253,671 A | | 10/1993 | Kolenc | |
| 5,326,078 A | | 7/1994 | Kimura | |
| 5,335,691 A | * | 8/1994 | Kolenc | 137/312 |
| 5,429,116 A | | 7/1995 | Brown | |
| 5,485,984 A | | 1/1996 | Itoi et al. | |
| 5,725,007 A | | 3/1998 | Stubbs | |
| 5,743,513 A | | 4/1998 | Yoshikawa et al. | |
| 6,088,916 A | * | 7/2000 | Singleterry et al. | 29/888.02 |
| 6,092,550 A | | 7/2000 | Gotch et al. | |
| 6,189,862 B1 | | 2/2001 | McKay | |
| 6,554,022 B2 | | 4/2003 | Wakeman | |

(Continued)

FOREIGN PATENT DOCUMENTS

EP   0 627 583 A2   6/1994

*Primary Examiner*—John K Fristoe, Jr.
*Assistant Examiner*—Marina Tietjen
(74) *Attorney, Agent, or Firm*—McNees Wallace & Nurick, LLC

(57) ABSTRACT

An apparatus and method for a diaphragm valve includes a valve body having a chamber in fluid communication with a first channel and a second channel. A diaphragm is disposed in the chamber, and a tapered seat member is at least partially disposed in the first channel. A sleeve is compressively disposed in the seat member between the seat member and the first channel to maintain a fluid tight seal between the seat member and the first channel. A valve member is movable to controllably urge the diaphragm into and out of engagement with the seat member to control flow of fluid between the first the first and second channel.

20 Claims, 3 Drawing Sheets

U.S. PATENT DOCUMENTS

| | | |
|---|---|---|
| 6,688,577 B2 | 2/2004 | Abbott |
| 6,752,377 B1 * | 6/2004 | Taylor et al. ................. 251/363 |
| 6,854,713 B2 | 2/2005 | Lin et al. |
| 6,907,897 B2 | 6/2005 | Maula et al. |
| 6,916,004 B2 | 7/2005 | Suzuki |
| 6,997,440 B2 * | 2/2006 | Tutt et al. ................... 251/331 |
| 2002/0134961 A1 * | 9/2002 | Antoff et al. ................. 251/363 |
| 2003/0025099 A1 | 2/2003 | Nakata et al. |
| 2003/0042459 A1 | 3/2003 | Gregoire |
| 2004/0108485 A1 * | 6/2004 | Lin et al. ..................... 251/331 |
| 2004/0262562 A1 | 12/2004 | Maula et al. |
| 2005/0211944 A1 * | 9/2005 | Tutt et al. ................... 251/331 |
| 2006/0011883 A1 * | 1/2006 | Martin ....................... 251/331 |

* cited by examiner

REMOVABLE VALVE SEAT MEMBER FOR DIAPHRAGM VALVE

FIELD OF THE INVENTION

The present invention is directed to a valve construction, and more particularly, the present invention is directed to a valve seat construction for diaphragm valves.

BACKGROUND OF THE INVENTION

Valves are widely used to provide precision flow and/or pressure control of fluids. Diaphragm valves are preferred in many applications due to the valve member being directed into and out of contact with a diaphragm, which likewise directs a valve seat into and out of engagement with the diaphragm to effect the desired fluid flow/pressure control. Other attributes diaphragm valves have are low internal volume, high sealing integrity, compact size and fast actuation/operation.

After being subjected to operational use, especially involving caustic or abrasive fluids and/or particulates or condensates, valve components, notably the valve seats, become worn or damaged so that the valve can no longer function properly. One solution is to replace the entire valve, which requires disconnecting the old valve from the connections of the using application or system, and then re-establishing those system connections. In addition to the cost of the replacement valve, care must be taken to ensure the system connections to the replacement valve do not leak.

In an attempt to address this problem, replacement valve seats have been developed. For example, U.S. Pat. No. 4,715,578 to Seltzer discloses a valve seat member composed of a synthetic resin that is threadedly engaged with the valve body, including an O-ring disposed between the valve seat member and the valve body. However, for reasons including the difference in thermal coefficients of expansion/contraction between the non-metallic valve seat member and the metallic valve body, the valve seat member is susceptible to working loose from the valve body.

Another valve construction is U.S. Pat. No. 6,854,713 to Lin et al., that discloses a valve body having a cylindrical opening formed in a flow channel for receiving a cylindrical non-metal valve base. The opening includes a groove formed in the valve body. Once the cylindrical non-metal valve base has been inserted into the cylindrical opening in the valve body, a tapered ring is directed into the inside diameter of the cylindrical non-metal valve base. Flanges extending outwardly from the ring further compress the valve base between the ring and the valve body, with the groove formed in the valve body opening sized to receive a portion of the valve base, due to expansion of the valve base. However, while being configured to address valve base expansion, U.S. Pat. No. 6,854,713 is not directed to a replaceable valve base. Moreover, the process of press-fitting the tightly fitting ring inside the valve base will necessarily deform the surface of the valve base contacting the diaphragm, which will compromise the quality of the seal between the valve base and the diaphragm. Finally, due to a portion of the valve base flowing into the groove in the opening securing the valve base within the valve body as it is deformed, it is unlikely that the valve base can be removed without damaging the valve body, which would necessitate replacement of the entire valve.

What is needed is an improved valve construction that permits replacement of the valve seat without damaging the valve body, which replacement can be accomplished with a manual hand tool.

SUMMARY OF THE INVENTION

The present invention relates to a diaphragm valve including a valve body including a chamber in fluid communication with a first channel and a second channel. A diaphragm is disposed in the chamber. A tapered seat member is at least partially disposed in the first channel, and a sleeve is compressively disposed in the seat member between the seat member and the first channel to maintain a fluid tight seal between the seat member and the first channel. A valve member is movable to controllably urge the diaphragm into and out of engagement with the seat member to control flow of fluid between the first the first and second channel.

The present invention still further relates to a method of constructing a diaphragm valve. The method includes providing a valve body including a chamber in fluid communication with a first channel and a second channel and then inserting a valve member in the valve body. The method further includes inserting a diaphragm in the chamber and inserting a sleeve inside a tapered seat member. The method further includes inserting the seat member at least partially in the first channel, the sleeve being compressively disposed between the seat member and the first channel to provide a fluid tight seal between the seat member and the first channel. The valve member is movable to controllably urge the diaphragm into and out of engagement with the seat member to control flow of fluid between the first the first and second channel.

An advantage of the present invention is that it allows for replacement of a valve seat for a diaphragm valve without replacing the valve.

Another advantage of the present invention is that it prevents creep of a valve seat for a diaphragm valve.

A further advantage of the present invention is that it applies a constant compressive force to retain a valve seat in position in the valve body.

Other features and advantages of the present invention will be apparent from the following more detailed description of the preferred embodiment, taken in conjunction with the accompanying drawings which illustrate, by way of example, the principles of the invention. Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
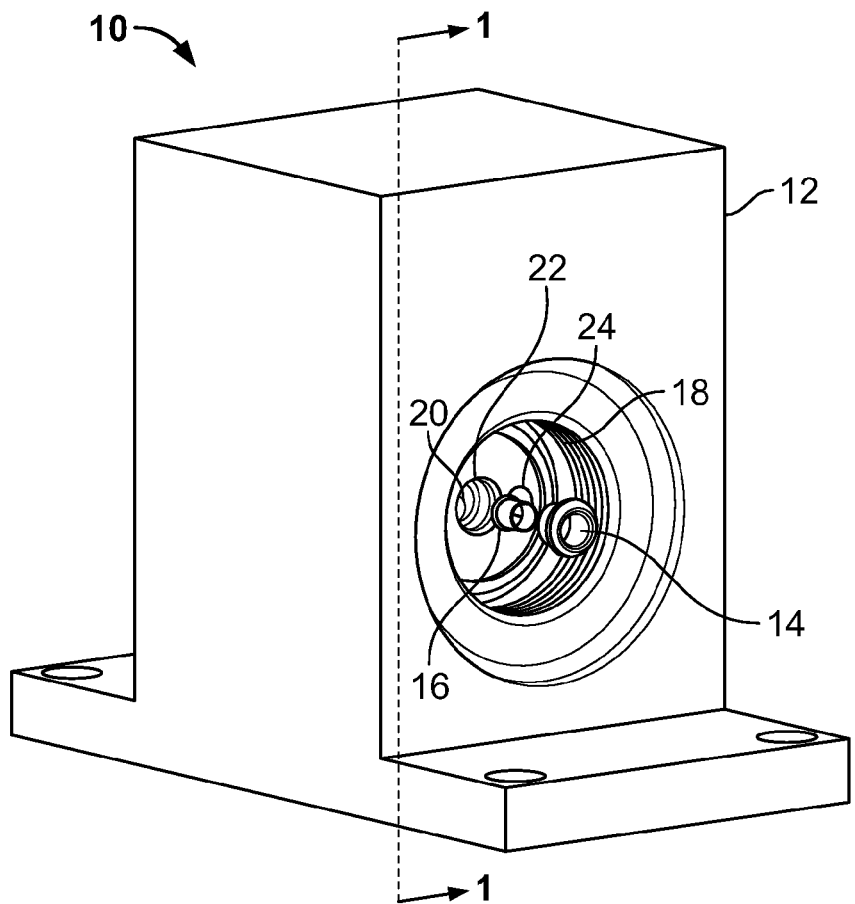
FIG. 1 is a partial exploded perspective view of an unassembled valve of the present invention.

One embodiment of a valve 10 of the present invention is depicted in FIG. 1. Preferably, referring to FIGS. 1-5, valve 10 includes a valve body 12 having a valve cavity 18 further opening into separate channels 20, 24 for directing a fluid through the valve body 12. A counterbored penetration or bore 22 receives a sleeve 16 and a seat member 14 that are preassembled prior to insertion into the bore 22. A diaphragm 28 is installed over the seat member 14, and a collet 34 is then installed in the valve cavity 18 over the diaphragm 28. Collectively, a lower portion 26 of the valve cavity 18, including an annular ridge 30 extending outwardly from the valve cavity 18 and the diaphragm 28 define an enclosed region 32 for permitting the selective flow of fluid between the channels 20, 24. To secure the diaphragm 28 between the annular ridge 30 of the valve body 12 and the collet 34, a nut 36 having a tapered shoulder 62 is threadedly engaged to abut a corresponding tapered surface of the collet 34 in the valve cavity 18. A valve member 38 is slidably disposed in an aperture 40 formed in the collet 34 for abutting the diaphragm 28. Collectively, the lower portion 26 of the valve cavity 18, collet 34 and valve member 38 define a chamber 31 within which the diaphragm 28 moves.

To controllably move valve member 38 toward the diaphragm 28, a stem 42 applies an axial force, such as by a pressurized fluid directed through a passageway 44 formed in the stem 42. Alternately, or in addition to the pressurized fluid, other means, such as springs (not shown) can also provide the axial forces. Upon application of sufficient axial forces by or through stem 42, valve member 38 is urged into contact with diaphragm 28 so that diaphragm 28 abuts seat member 14 to interrupt fluid communication between channels 20 and 24. In other words, when the valve member 38 is urged into contact with diaphragm 28 with sufficient force, a portion of the resilient diaphragm 28 is urged into abutting contact with the seat member 14 to interrupt fluid flow between channels 20, 24.

Figure 2:
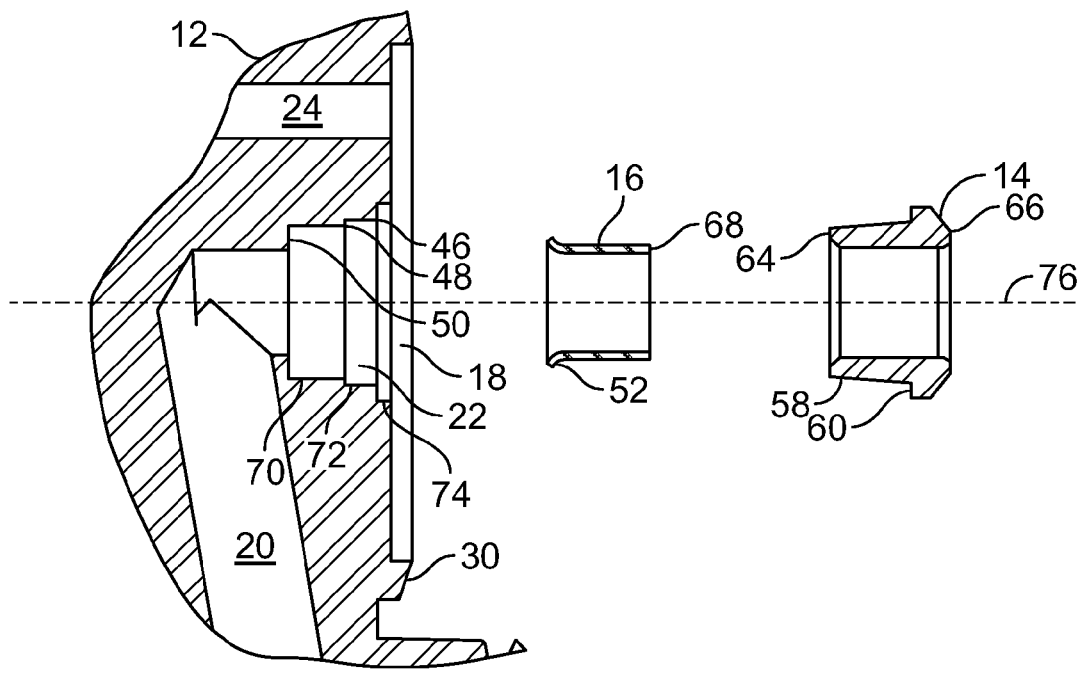
FIG. 2 is a partial exploded cross section of an unassembled valve taken along line 1-1 of the present invention.
Figure 3:
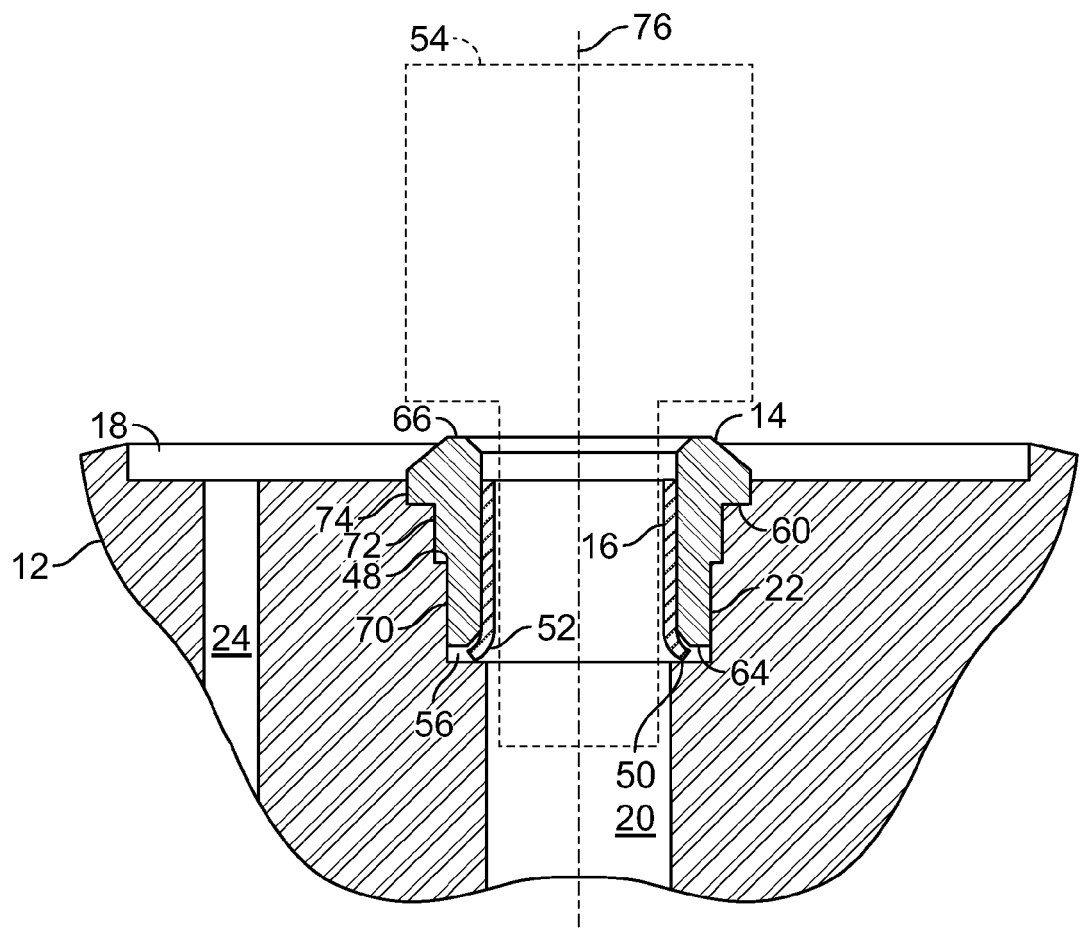
FIG. 3 is a cross section of an assembled valve seat member of the present invention.
Figure 4:
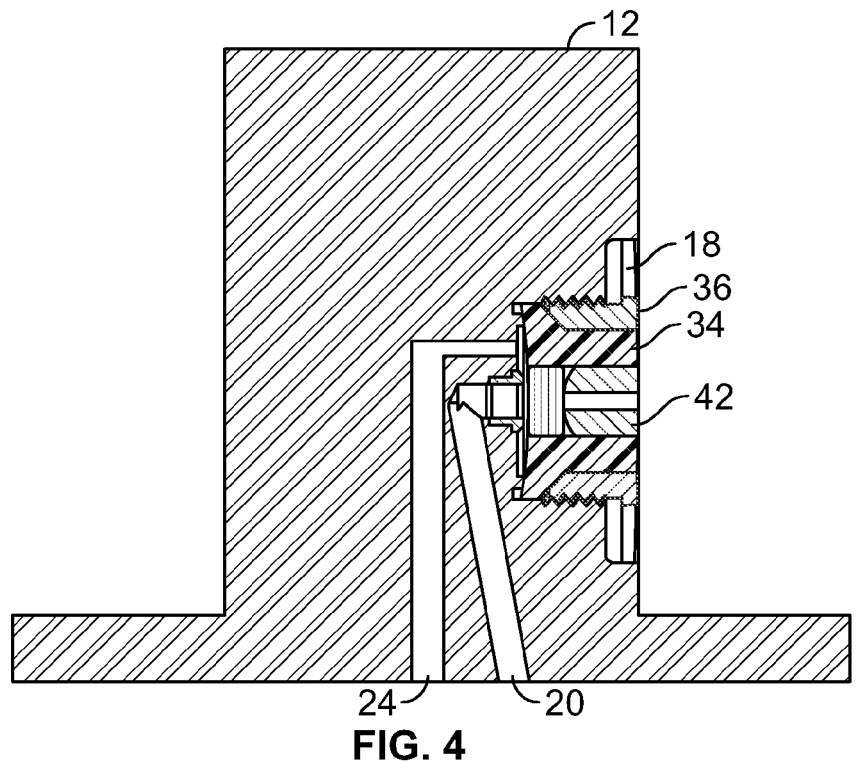
FIG. 4 is cross section of an assembled valve of the present invention.
Figure 5:
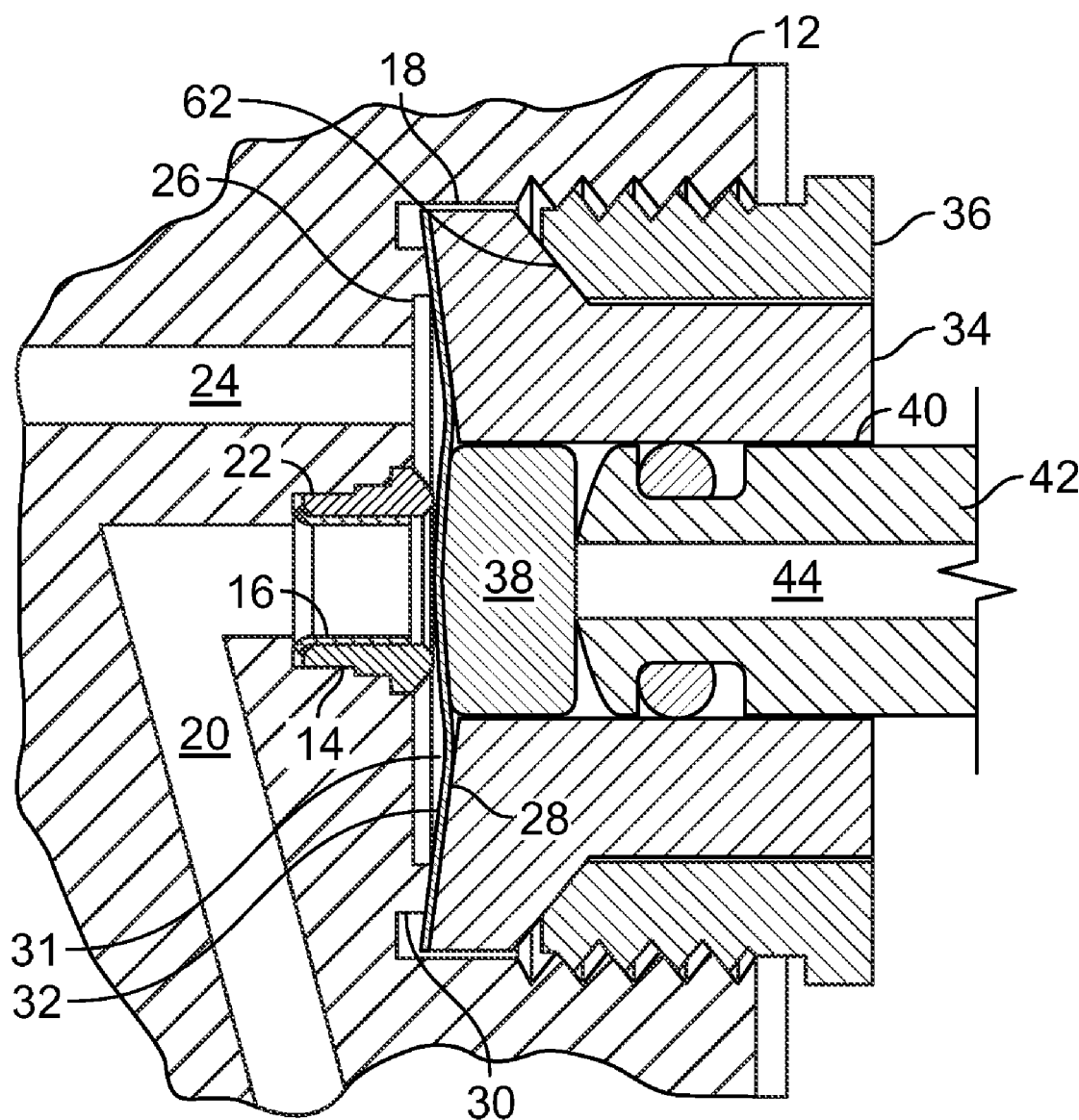
FIG. 5 is an enlarged partial cross section of an assembled valve of the present invention.

One embodiment of a removable valve seat member 14, as shown in assembled form in FIG. 3, is also shown in unassembled form in FIG. 2. Prior to assembly, seat member 14 includes an outer tapered portion 58, which extends from an end 64 to an annular shoulder 60 that terminates in an opposite end 66. Preferably, the inner surface of seat member 14 has a substantially uniform inside diameter that receives an end 68 of sleeve 16. Similarly, sleeve 16 is a hollow cylinder of substantially constant cross section and substantially constant outside diameter. Optionally, the end opposite end 68 of sleeve 16 is flared 52. Preferably, seat member 14 is composed of a resilient polymeric material such as polychlorotrifluoroethylene, polyetheretherketone or other suitable materials.

Sleeve 16 is preferably composed of metal or a material of sufficient structural strength and compatibility with valve applications and materials, and also having a substantially similar thermal coefficient of expansion/contraction as the valve body 12. The inside diameter of seat member 14 and the outside diameter of seat 16 are sized so that end 68 of seat 16 can be directed inside of end 64 of seat member 14. Once seat member 14 and sleeve 16 have been preassembled, end 64 of seat 16 is directed into a bore 22 and pressed into position.

As shown in FIG. 2, from the valve cavity 18, bore 22 is disposed at the entrance to channel 20. In one embodiment, bore 22 includes bore portions 70, 72, 74 that are substantially concentric with respect to axis 76. Bore portion 70 has the smallest diameter of bore portions 70, 72, 74 and terminates at a base 50 in channel 20. Adjacent to bore portion 70 is bore portion 72 which has a slightly larger diameter than bore portion 70 with the juncture between bore portions 70, 72 defining a ridge 48. Similarly, adjacent to bore portion 72 is bore portion 74 which has a slightly larger diameter than bore portion 72 with the juncture between bore portions 72, 74 defining a ridge 46. It is to be understood that bore portions 70, 72, 74 define a tapered profile, although the circumferential walls of the bore portions 70, 72, 74 are substantially parallel to each other. Additionally, annular ridges 46, 48 preferably are substantially perpendicular to axis 76. It is also to be understood that bore 22 can include more than three base portions, if desired, and that none of the bore portions are necessarily of the same length. It is also not required that the difference in diameter between adjacent bore portions are equal.

It is to be understood that base portions 70, 72, 74 are not limited to a circular profile, and can include, for example, an ovular profile, nor must annular ridges 46, 48 necessarily be planar, that is, for example, the ridge profiles can be curved. However, both the base portions 70, 72, 74 and ridges 46, 48 must each be symmetric about a plane that is coincident with the axis 76 so that resultant forces developed between seat member 14, base portions 70, 72, 74, and sleeve 16, during installation as well as during operation, i.e., due to pressurized fluid or temperature, are substantially equally applied to each half of the seat member 14 and sleeve 16. It is also to be understood that sleeve 16 has a matching profile with respect to base portions 70, 72, 74 so as to ensure the spacing is also symmetric, and thus, the resulting installation and operational forces between the base portions 70, 72, 74 and the sleeve 16 are also symmetric. That is, if the base portions 70, 72, 74 are non-circular, sleeve 16 has a similarly configured non-circular profile.

To install the preassembled seat member 14 and sleeve 16 in the valve body 12, end 64 of seat member 14 is directed into bore 22. However, as shown in FIG. 3, a tool, such as tool 54, is required to maintain the seat member 14 and sleeve 16 in alignment with axis 76 and to additionally urge seat member 14 and sleeve 16 toward an installed or seated position in bore 22. In the seated position, flared end 52 of sleeve 16 abuts base 50 of bore portion 70 and the juncture of shoulder 60 and tapered portion 58 of seat member 14 abuts ridge 46. Flared end 52 helps provide a fluid tight seal between the sleeve 16 and base 50 of base 22. End 66 of seat member 14 extends both upwardly and outwardly from bore 22 a predetermined distance for interacting with the diaphragm 28 to control fluid flow between channels 20, 24. To help provide a substantially fluid tight interface between seal member 14 and bore 22, the inside diameter of ridge 48 is less than the outside diameter of at least a portion of tapered portion 58. Stated another way, during installation of the seat member 14 inside of bore 22, at least a portion of the surface of the tapered portion 58 is plastically deformed by ridge 48 as the tapered portion 58 is further pressed into the bore 22 by the installation tool 54. Additionally, due to the presence of sleeve 16, which substantially maintains the inside diameter of the seat member 14 by applying a constant compression force similar to a spring, the seat member 14 is plastically deformed to fit the space provided between sleeve 16 and bore 22. As further shown in FIG. 3, the tapered portion 58 of seat member 14 is forced to conform to the bore portions 70, 72. A small gap 56 in bore portion 50 between end 64 of the seat member 14 and the base 50 of the bore portion 70 can remain, if desired, by sizing the bore 22, seat member 14 and sleeve 16 to account for thermal expansion of the seat member 14.

The arrangement of the bore 22, tapered seat member 14 and sleeve 16 provide numerous benefits. In addition to providing a fluid tight seal between the seat member 14 and the bore 22 as originally installed, increased fluid pressure in channel 20 results in sleeve 16 applying additional compressive forces to the seat member 14, creating an even tighter seal. Further, the arrangement does not allow the polymeric seat member material to expand due to thermal expansion or to swell due to liquid or gas permeability into the polymeric seal material. This expansion prevention is due to the sleeve 16 providing substantially constant compression to the seat member, as well as the sleeve 16 being of sufficient structural strength to react the forces created by the polymeric seat member material during swelling or expansion. Without such expansion prevention, the seat member would otherwise be susceptible to thermal cycling, due to the polymeric seat member having a thermal coefficient of expansion/contraction that is an order of magnitude greater than that of metal, with the risk of the polymeric material "working loose" over time. In other words, during installation, the seat member 14 is sufficiently compressed so that at the extreme operating temperature, i.e., cold temperatures, the seat member 14 doesn't pull away from the bore 22. That is, at lower temperatures when the seat member 14 is maximally contracted, the level of compression experienced by the seat member is reduced, but not eliminated, while continuing to maintain contact with the bore 22.

A further advantage is its utility in response to raised valve temperatures. As the valve temperature increases, the polymeric seat member material becomes more flexible, typically lowering its ability to counteract fluid pressure. Due to the arrangement of the bore 22, tapered seat member 14 and sleeve 16, in response to rising valve temperature, sleeve 16 expands, tightening the seal with the polymeric material. Tightening this seal provides improved seal integrity at raised temperatures. Additionally, via the arrangement of the present invention, the seat member 14 is not susceptible to permanent plastic deformation due to prolonged exposure to stress or elevated temperature or creep. This is essentially due to the sleeve 16 being constructed of materials not susceptible to creep.

Moreover, an additional advantage of the arrangement of the present invention is that removal of the seat member 14 can be achieved using a common manual tool, such as a hand tap (not shown). The tapping tool can be used to engage sleeve 16 to easily and conveniently remove both the sleeve 16 and seat member 14, requiring only manual force. Ease of removal is possible due to the tapered construction of bore 22.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A diaphragm valve comprising:
   a valve body including a chamber in fluid communication with a first channel and a second channel;
   a bore formed in the first channel, the bore comprising a ridge;
   a diaphragm disposed in the chamber;
   a seat member at least partially disposed in the first channel, the seat member having an outer tapered portion, the outer tapered portion being disposable inside the valve body, the outer tapered portion of the seat member being plastically deformed by the ridge when the seat member is assembled in the bore;
   a sleeve compressively disposed in the seat member between the seat member and the first channel to maintain a fluid tight seal between the seat member and the first channel; and
   a valve member movable to controllably urge the diaphragm into and out of engagement with the seat member to control flow of fluid between the first and second channel.

2. The valve of claim 1 wherein the first channel includes at least one counterbore for receiving the seat member.

3. The valve of claim 2 wherein the at least one counterbore is concentric.

4. The valve of claim 3 wherein the at least one counterbore having at least two differently sized bore portions, with junctions between adjacent bore portions defining at least two ridges.

5. The valve of claim 1 wherein the seat member is a polymeric.

6. The valve of claim 1 wherein the seat member is plastically deformed and compressed between the first channel and the sleeve during installation of the seat member into the first channel.

7. The valve of claim 1 wherein the sleeve includes a flared end.

8. The valve of claim 1 wherein an end of the sleeve abuts a base formed in the first channel.

9. The valve of claim 7 wherein the flared end abuts a base formed in the first channel.

10. The valve of claim 1 wherein the sleeve is composed of a material that is different from the seat member.

11. The valve of claim 10 wherein a coefficient of expansion/contraction of the sleeve is less than a coefficient of expansion/contraction of the seat member.

12. A method for constructing a diaphragm valve, the method comprising:
   providing a valve body including a chamber in fluid communication with a first channel and a second channel;
   a bore formed in the first channel, the bore comprising a ridge;
   inserting a valve member in the valve body;
   inserting a diaphragm in the chamber between the valve member and the first channel and the second channel;
   inserting a sleeve inside a seat member having an outer tapered portion;
   inserting the seat member at least partially in the first channel, the seat member being compressively disposed between the sleeve and the first channel to provide a fluid tight seal between the seat member and the first channel, the outer tapered portion of the seat member being plastically deformed by the ridge when the seat member is assembled in the bore;
   wherein the valve member being movable to controllably urge the diaphragm into and out of engagement with the seat member to control flow of fluid between the first and second channel; and
   wherein the outer tapered portion is disposable inside the valve body.

13. The method of claim 12 wherein the step of inserting a sleeve inside the seat member occurs prior to the step of inserting the seat member at least partially in the first channel.

14. The method of claim 12 further includes the step of removing the sleeve and seat member without damaging the first channel.

15. The method of claim 12 wherein the step of inserting the seat member at least partially in the first channel plastically deforms and compresses the seat member between the first channel and the sleeve.

16. The method of claim 12 wherein the sleeve includes a flared end.

17. The method of claim 12 wherein an end of the sleeve abuts a base formed in the first channel.

18. The method of claim 16 wherein the flared end abuts a base formed in the first channel.

19. The method of claim 12 wherein the sleeve is composed of a material that is different from the seat member.

20. The method of claim 19 wherein a coefficient of expansion/contraction of the sleeve is less than a coefficient of expansion/contraction of the seat member.

* * * * *